(12) United States Patent
Hyder et al.

(10) Patent No.: US 7,680,854 B2
(45) Date of Patent: **\*Mar. 16, 2010**

(54) SYSTEM AND METHOD FOR IMPROVED JOB SEEKING

(75) Inventors: Adam Hyder, Los Altos, CA (US);
Sandeep Khanna, Los Altos, CA (US);
Pal Takacsi-Nagy, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/173,837

(22) Filed: Jun. 30, 2005

(65) Prior Publication Data

US 2006/0206448 A1 Sep. 14, 2006

Related U.S. Application Data

(60) Provisional application No. 60/661,280, filed on Mar. 11, 2005.

(51) Int. Cl.
*G06F 7/00* (2006.01)
*G06F 17/00* (2006.01)

(52) U.S. Cl. .................. 707/710; 707/722; 707/736; 707/755; 707/756; 707/811; 707/947

(58) Field of Classification Search .......... 707/1–3, 707/10, 104.1, 101–102; 705/11
See application file for complete search history.

(56) References Cited

U.S. PATENT DOCUMENTS

| | | | |
|---|---|---|---|
| 5,655,130 A * | 8/1997 | Dodge et al. | 715/210 |
| 5,805,747 A * | 9/1998 | Bradford | 382/310 |
| 6,370,510 B1 * | 4/2002 | McGovern et al. | 705/1 |
| 6,571,243 B2 | 5/2003 | Gupta et al. | |

(Continued)

OTHER PUBLICATIONS

Notification of Concerning Transmittal Of International Preliminary Report on Patentability PCT/US2006/008906).

(Continued)

*Primary Examiner*—John R Cottingham
*Assistant Examiner*—Susan F Rayyan
(74) *Attorney, Agent, or Firm*—James J. DeCarlo; Greenberg Traurig, LLP

(57) ABSTRACT

A computer system and method for capture and handling job listings obtained from various often unrelated corporate and job board postings via the internet for examination by a job searcher. This system includes a scraping module having one or more scraping engines operable to scrape job information data set from job listings on the corporate career sites and job boards, wherein the scraping module receives and stores the scraped job information data set in a database. The system also has a scraping management interface module coordinating operation of and communication between the scraping engines and the career sites and job boards, a scraped listing quality management module coupled to the scraping management interface module analyzing selected scraped job information data stored in the database, and a job categorization module that examines and categorizes each job information stored in the database into one or more of a predetermined set of categories and returns categorized job information to the database, and an extractor module communicating with the database for compiling and transferring categorized job information data from the database to a search bank. The search bank is then accessible by a job searcher through a job search client server cluster connected to the Internet.

35 Claims, 9 Drawing Sheets

U.S. PATENT DOCUMENTS

| | | | |
|---|---|---|---|
| 6,681,223 | B1 | 1/2004 | Sundaresan |
| 6,711,589 | B2 | 3/2004 | Dietz |
| 6,757,674 | B2 | 6/2004 | Wiens et al. |
| 7,191,176 | B2 | 3/2007 | McCall et al. |
| 7,272,610 | B2 * | 9/2007 | Torres ........................ 707/101 |
| 2001/0049674 | A1 | 12/2001 | Talib et al. |
| 2002/0026452 | A1 | 2/2002 | Baumgarten et al. |
| 2002/0072946 | A1 * | 6/2002 | Richardson .................... 705/8 |
| 2002/0091689 | A1 | 7/2002 | Wiens et al. |
| 2002/0120532 | A1 * | 8/2002 | McGovern et al. ............. 705/26 |
| 2002/0143573 | A1 | 10/2002 | Bryce et al. |
| 2003/0009437 | A1 | 1/2003 | Seiler et al. |
| 2003/0014294 | A1 | 1/2003 | Yoneyama et al. |
| 2003/0023474 | A1 * | 1/2003 | Helweg-Larsen ............... 705/9 |
| 2003/0033292 | A1 | 2/2003 | Meisel et al. |
| 2003/0046311 | A1 * | 3/2003 | Baidya et al. ................ 707/200 |
| 2003/0061242 | A1 * | 3/2003 | Warmer et al. ............... 707/200 |
| 2003/0088465 | A1 | 5/2003 | Monteverde |
| 2003/0097357 | A1 * | 5/2003 | Ferrari et al. ................... 707/3 |
| 2003/0142128 | A1 | 7/2003 | Reulein et al. |
| 2003/0172145 | A1 * | 9/2003 | Nguyen ........................ 709/223 |
| 2003/0204439 | A1 * | 10/2003 | Cullen, III ..................... 705/11 |
| 2003/0216930 | A1 | 11/2003 | Dunham et al. |
| 2004/0064477 | A1 | 4/2004 | Swauger |
| 2004/0107112 | A1 * | 6/2004 | Cotter ............................ 705/1 |
| 2004/0107123 | A1 * | 6/2004 | Haffner et al. .................. 705/7 |
| 2004/0267549 | A1 | 12/2004 | Anderson et al. |
| 2004/0267735 | A1 * | 12/2004 | Melham ......................... 707/3 |
| 2005/0004927 | A1 | 1/2005 | Singer |
| 2005/0076293 | A1 * | 4/2005 | Beresnevichiene .......... 715/514 |
| 2005/0120294 | A1 * | 6/2005 | Stefanison et al. .......... 715/506 |
| 2005/0125408 | A1 | 6/2005 | Somaroo et al. |
| 2005/0154699 | A1 * | 7/2005 | Lipkin et al. .................... 707/1 |
| 2005/0209955 | A1 * | 9/2005 | Underwood et al. .......... 705/38 |
| 2005/0210514 | A1 | 9/2005 | Kittlaus et al. |
| 2005/0216295 | A1 * | 9/2005 | Abrahamsohn ................ 705/1 |
| 2006/0010108 | A1 | 1/2006 | Greenberg |
| 2006/0100919 | A1 | 5/2006 | Levine |
| 2006/0155698 | A1 | 7/2006 | Vayssiere |
| 2006/0206505 | A1 | 9/2006 | Hyder |
| 2006/0206517 | A1 | 9/2006 | Hyder et al. |
| 2006/0206584 | A1 | 9/2006 | Hyder |
| 2006/0212466 | A1 | 9/2006 | Hyder |
| 2006/0229896 | A1 | 10/2006 | Rosen et al. |
| 2006/0229899 | A1 | 10/2006 | Hyder |
| 2006/0242013 | A1 * | 10/2006 | Agarwal et al. ................ 705/14 |
| 2007/0101065 | A1 * | 5/2007 | Walker ....................... 711/133 |
| 2007/0214140 | A1 | 9/2007 | Dom et al. |
| 2008/0183488 | A1 | 7/2008 | Vianello |

OTHER PUBLICATIONS

Notification of Transmittal of The International Search Report And the Written Opinion of The International Searching Authority, Or Declaration (PCT/US2006/008907).
International Search Report (PCT/US06/08893).
Official Action from the United States Patent and Trademark Office for U.S. Appl. No. 11/174,393 dated Apr. 30, 2009.
Official Action from the United States Patent and Trademark Office for U.S. Appl. No. 11/174,393 dated Oct. 24, 2008.
Official Action from the United States Patent and Trademark Office for U.S. Appl. No. 11/174,393 dated May 1, 2008.
Official Action from the United States Patent and Trademark Office for U.S. Appl. No. 11/174,393 dated Jul. 11, 2007.
Official Action from the United States Patent and Trademark Office for U.S. Appl. No. 11/174,393 dated Mar. 9, 2007.
Official Action from the United States Patent and Trademark Office for U.S. Appl. No. 11/174,393 dated Sep. 27, 2006.
Official Action from the United States Patent and Trademark Office for U.S. Appl. No. 11/173,656 dated May 1, 2009.
Official Action from the United States Patent and Trademark Office for U.S. Appl. No. 11/173,470 dated Mar. 31, 2009.
Official Action from the United States Patent and Trademark Office for U.S. Appl. No. 11/173,470 dated Oct. 7, 2008.
Official Action from the United States Patent and Trademark Office for U.S. Appl. No. 11/173,470 dated May 29, 2008.
Official Action from the United States Patent and Trademark Office for U.S. Appl. No. 11/173,470 dated Jan. 24, 2008.
Official Action from the United States Patent and Trademark Office for U.S. Appl. No. 11/173,470 dated Mar. 9, 2007.
Official Action from the United States Patent and Trademark Office for U.S. Appl. No. 11/173,470 dated Sep. 29, 2006.
Official Action from the United States Patent and Trademark Office for U.S. Appl. No. 11/372,497 dated Mar. 18, 2009.
Official Action from the United States Patent and Trademark Office for U.S. Appl. No. 11/372,497 dated Oct. 23, 2008.
Official Action from the United States Patent and Trademark Office for U.S. Appl. No. 11/372,497 dated Apr. 7, 2008.
Official Action from the United States Patent and Trademark Office for U.S. Appl. No. 11/372,528 dated Apr. 1, 2009.

* cited by examiner

SYSTEM AND METHOD FOR IMPROVED JOB SEEKING

CROSS REFERENCE TO RELATED APPLICATIONS

This application claims the benefit of priority of U.S. Provisional Application Ser. No. 60/661,280, filed Mar. 11, 2005, the disclosure of which is hereby incorporated by reference in its entirety.

BACKGROUND

1. Field

This disclosure relates to software and more particularly to a system and method for assisting job seekers in their job search efforts.

2. General Background

Various job search vehicles are available to a job searcher or recruiter today on the Internet, e.g. the World Wide Web (web). However, the available resources that can be scrutinized are somewhat limited. Accordingly there is a need for a system that more completely searches and organizes information that can be obtained from as many sources as possible via the Internet and present search results in an effective manner to a job searcher in response to a query.

SUMMARY

The system described herein is a system for improved job search that operates through the use of several techniques including scraping technology to scour the web and obtain job opportunity information from career sites available on the Internet, and particularly the World Wide Web, although, as job information may be distributed on other networks now known or to become known, the system and functionality described herein is applicable to any distributed information environment whereby information can be obtained by manual or automated systems.

A job seeker seeking information about jobs will have a larger universe of job information to review when utilizing the system described herein. Specifically, the system makes use of scraping technology, to build a database that is populated with job information data sets. The database may also include job information from other sources such as job information supplied by corporations seeking applicants and/or provided by methods other than through scraping. The system receives the job information and then, utilizing an internal quality management process, maximizes the quality of the information contained in each individual job information data set to maximize usefulness to the user and to improve the user's overall job searching experience when utilizing the system described herein.

This system includes a scraping module having one or more scraping engines operable to scrape job information data from job listings on the corporate career sites and job boards, wherein the scraping module receives and stores the scraped job information data set in a database. The system also has a scraping management process module coordinating operation of and communication between the scraping engines and the career sites and job boards. A scraped listing quality management process module is coupled to the scraping management process module analyzing selected scraped job information data sets stored in the database. A job categorization module examines and categorizes job information stored in the database into one or more of a predetermined set of categories and returns categorized job information sets to the database. An extractor module communicates with the database and compiles and transfers categorized job information data from the database to a search bank. The search bank is then accessible by a job searcher through a job search client server cluster connected to the Internet.

A preferred embodiment of the method of this disclosure includes operations of scraping job information data sets from one or more job listings on one or more corporate career sites or job boards, storing the scraped job information data corresponding to each scraped job listing in a database, analyzing each scraped job information data set stored in the database for conformance to predetermined quality criteria, categorizing each job information stored in the database into one or more predetermined job categories and returning the categorized job information data sets to the database, and transferring categorized job information data sets from the database to the search bank.

The categorizing operation preferably includes operations of comparing text of each scraped job information data set with previously categorized job information text in a categorization database, and determining a confidence value in each predetermined category for each scraped job information data set. More preferably, the method includes flagging each categorized scraped job information data set that has a confidence value below a predetermined value for manual review, and providing a manual review interface permitting a reviewer to verify any flagged categorizations.

The method further may include assigning a confidence value for the category assigned to each job information data set returned to the database and flagging any job information data set returned to the database having an assigned confidence level below a predetermined threshold. The techniques utilized in automatic categorization of a product, including such products as job listings, are described in detail in U.S. patent application Ser. No. 10/920,588, filed Aug. 17, 2004, and entitled Automatic Product Categorization, assigned to the assignee of this disclosure.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
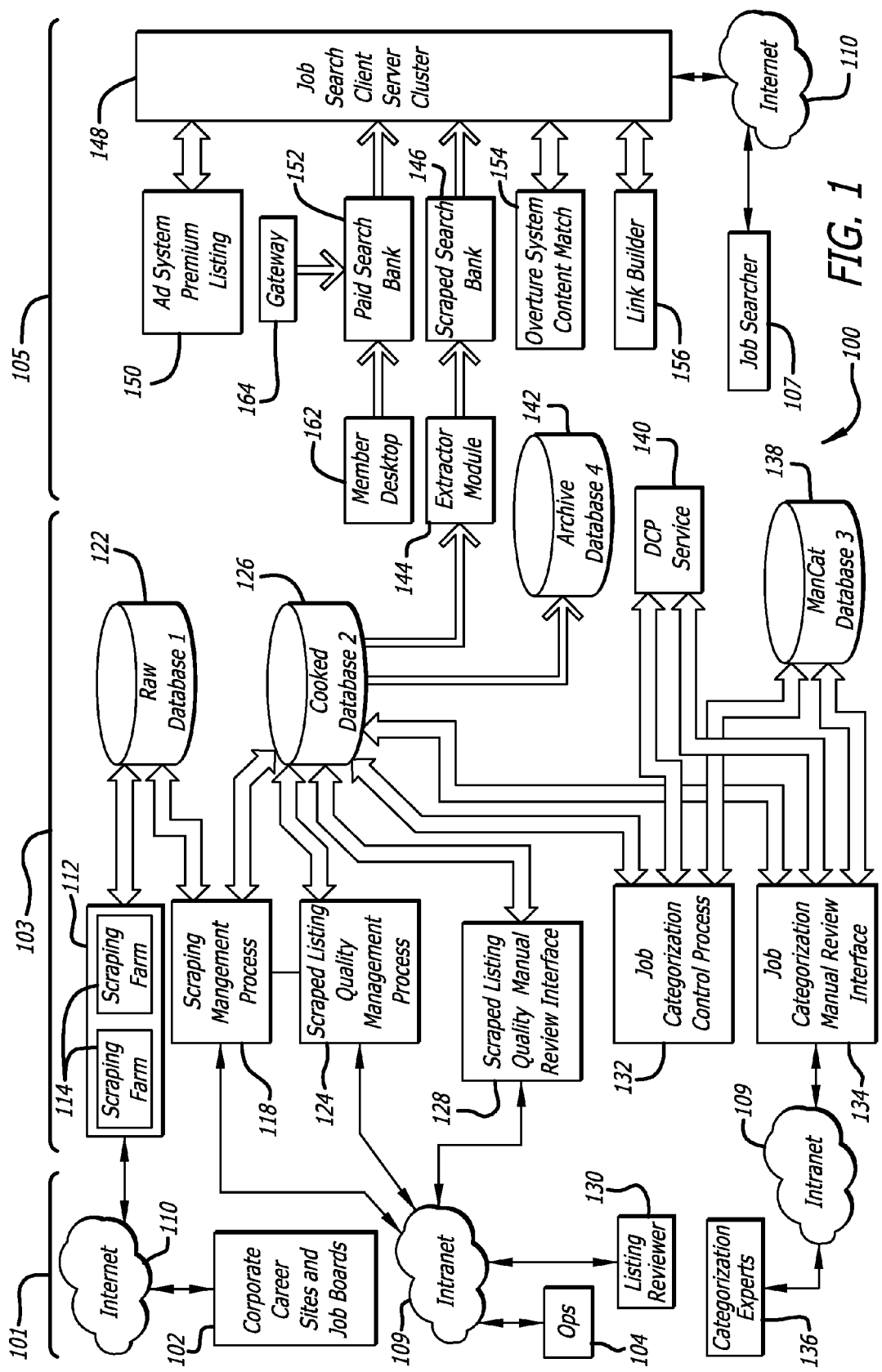
FIG. 1 is a block diagram of a system in accordance with an embodiment of the present disclosure.

An overall architecture diagram of the job search system 100 in accordance with an embodiment of this disclosure is shown in FIG. 1. The system 100 can be thought of as having three sections: an external input section 101, a data handling section 103, and an output handling section 105. Basically the data handling section reaches to the external input section 101 for job data, processes the data, organizes and verifies validity of the data, categorizes the job data, and provides the data to the output section which may be accessed eventually by a job seeker 107 via the internet 110.

The external input section 101 includes the job postings that may be accessed by the data handling section from such sources as corporate and company career sites and a number of other job boards 102. These corporate career sites and job boards 102 currently consist of several thousand company career sites. Also providing input to the data handling section 103 are systems operations personnel 104, listing reviewers 106 and categorization experts 108. These entities provide various input via an intranet 109 through suitable web browser interfaces such as Internet Explorer marketed by Microsoft Corporation utilizing administrator user interfaces appropriate to their purpose.

The data handling section 103 comprises a series of modules that together assimilate job information scraped from the sites 102 into an orderly configuration generally described as follows. A scraping module 112 in the data handling section 103 has one or more job scraping engines 114. These job scraping engines are software routines that are used to query each of the several thousand sites and job boards 102 for new job postings and job information data sets. Such job information data sets include parameters unique to the job posting such as title, company, city, state, salary, hours, skills, qualifications, experience etc. and a detailed job description that describes, in paragraph form, the duties, experience and tasks to be performed in the job. The scraping module 112 comprises one more scraping engine farms 114 that typically use different scraping technologies and methodologies which may be developed as a matter of design choice but are preferably specifically directed in a preferred embodiment herein for searching over a global electronic network such as the Internet 110, with each engine 114 being optimized for either a particular type of scraping task or particular type or set of corporate sites. For example, the Kelkoo scraping engine farm, developed by Kelkoo, Inc. in Europe, now a subsidiary of Yahoo, Inc., is optimized to thoroughly scour a predetermined known corporate site or listing site. The Kelkoo scraping engine is optimized to follow internal links within the site to specific internal locations to extract job information data sets. However, it does not follow external links. The Cafe/Kelsa Scraping engine farm, developed by Yahoo, Inc., and described in U.S. patent application Ser. No. 11/064,278, filed Feb. 22, 2005 and entitled Techniques for Crawling Dynamic Web Content, is optimized to systematically examine a seed URL and follow every link within the site and follow every internal and external link that may be provided on that URL as well as links it finds on its "crawl."

Preferably, a scraping agent is created for each career site 102 that is desired to be searched for job postings/listings and corresponding job information. The scraping agent uniquely has a URL address for its particular destination site, and essentially is a file that provides the parameters to the Kelkoo scraping farm as to what areas on a particular site can be searched, how often, and when for each particular site so that the individual sites are not overused and overscraped. In contrast, the scraping agent for the Cafe Kelsa scraping engine farm preferably simply contains the site URL and scraping frequency requirement information.

Once the scraping module 112 performs a scrape of the desired career sites, the results of the scraping exercise are passed to a scraping management process module 118 and stored in a Raw Database 122. This scraping management process module 118 performs functions such as scrape scheduling, error handling, recovery in the event of software failures, error logging and reporting, and monitoring of the scraping process. Thus, for example, scraping management process module 118 may perform objective tests against the raw data to identify gross errors such as non-delivery of information from a site designed to be scraped, garbled data, or data that is comprised of fewer than a predetermined number of bytes, which would be indicative of a failed scraping exercise. Scraping management module 118 is administratively operated externally by operators 120 via an internet 110 connection into the module 118 in a known manner. The resulting output of the scraping management module 112 is fed back to and updates the raw database 122. This database 122 contains the raw data as received by the scraping process performed by the scraping module 112, and as corrected in the scraping management module 118. The output of module 118 is also collected in a cooked, i.e. modified, database 126.

The scraping management process module 118 communicates with the scrape listing quality manager module 124. The scrape listing quality management module 124 instructs the scraping management process module 118 when to transfer a job information data set to the cooked database 126 and then this module 124 preferably begins examination of that data set. The scraped listing quality management module 124 pulls scraped data from the cooked database 126 and performs further quality management tests on the scraped job information received as part of the scraping exercise in module 112. For example, the listing quality management module 124 performs a high level of quality management such as collecting byte count or job count information from the scraping exercise, performs site comparisons, checks for required fields, compares with previously encountered listings from the same job site to compare data formatting and also to delete duplicates, i.e. "de-dupe," data to avoid redundant listings. This module also detects and removes dead links and filters profanity and offensive text. The scrape listing quality management module 124 then updates the data set and returns it to the cooked database 126. Again, this module 124 is administered and operated by operations via an intra 109 connection via a suitable web browser.

If, in examining a job information data set in module 124, it is determined that the quality does not meet predetermined criteria, for example, a manual review quality flag can be set in that data set when it is returned to the cooked database 126 by the listing quality management module 124. A scrape listing quality manual review interface module 128 permits an operator to periodically examine the cooked database 126 for data sets having these set flags. This module 128 indexes these data sets and then utilizes the services of human listing reviewers 130 to perform the highest level of quality management on the scraped job listings to ensure the highest level of quality or to review listings that automated modules 118 and 124 were unable to pass as quality listings.

Depending on the nature and scope of the quality issues presented by a particular listing, the job listing (job information data set) may be passed to the cooked database 126 through the scraped listing quality management module 124. This cooked database 126 contains job listings that have undergone a satisfactory level of quality management. Thus, modules 118 and 124 all have the ability to pass approved job listing data sets to the cooked database 126 as well as job listings that have been manually reviewed as part of the manual review process module 128.

A job categorization control process module 132 then reviews the job information data sets that pass the quality reviews in the cooked database 126 in order to accurately categorize each job listing. It is important that a job listing be placed in the proper job category, such as for example, information technology, healthcare, accounting, etc. The job categorization control process module 132 preferably is automated.

In addition, a manual review interface module 134 is available to review job information data sets that the module 132 flags for manual review. This module permits categorization experts 136 to verify categorization data via an intranet connection 109 and update content of a manual categorization "mancat" database 138 and the DCP service 140. However, the function of the experts 136 may alternatively, as is the case with listing reviewer entities discussed earlier, be automated routines in the future as such systems become more sophisticated.

The job categorization control process module 132 is preferably automated, while the manual review process module 134 provides a manual check on quality, thus providing a high degree of accuracy in job categorization. The results of this categorization process are stored in "mancat" database 138, which is a contraction name for the manual categorization database.

The job categorization process module 132 and the manual review interface 134 both feed job categorization information to a document categorization platform (DCP) service module 140, identified herein as DCP 140. The DCP service module 140 looks at the jobs and analyzes the entire text of each job description in each job information data set for comparison to a database of other text to determine a confidence value. Thus, the DCP service module 140 is an automated process that, over a time period, can be "trained" to accurately characterize job information data sets scraped and passed through various levels of quality management.

The DCP service module 140 functionality is described in more detail in U.S. patent application Ser. No. 10/920,588, mentioned above, along with the related U.S. patent applications referred to therein. The DCP service module 140 preferably compares the text of a newly submitted job description with existing job information data sets in the same category, and look for specific characteristics such as education, use of similar terminology, length, companies worked for, etc., to arrive at a particular level of confidence that the categorization is accurate. Failure to achieve a particular level of confidence through this text matching, for example, a 70% match or less would result in job information being held and placed into the manual characterization database 138 for manual review. A 90% match, would result in job information having a high degree of confidence. This information is attached, or otherwise associated with job information that is stored in the cooked database 126. Similarly, a job description that has been manually characterized can be identified to cooked database 126 as a job description with a high degree of confidence that has been correctly characterized or categorized.

For archival storage purposes, periodically the contents of the cooked database 126 are placed in the archive database 142. Similarly the content of the other databases 138 and 122 may be periodically rotated and dumped for archival purposes to the database 142.

Another component in the data handling section 103 is an extractor module 144. This extractor module 144 works in conjunction with and interfaces directly to a scraped job search bank 146 in the output section 105 of the system 100. The extractor component or module 144 takes cleansed and categorized job information data sets from the cooked database 126. It reformats them into a format for use by the scraped search bank 146 and transfers the reformatted data sets to the search bank 146.

Figure 2:
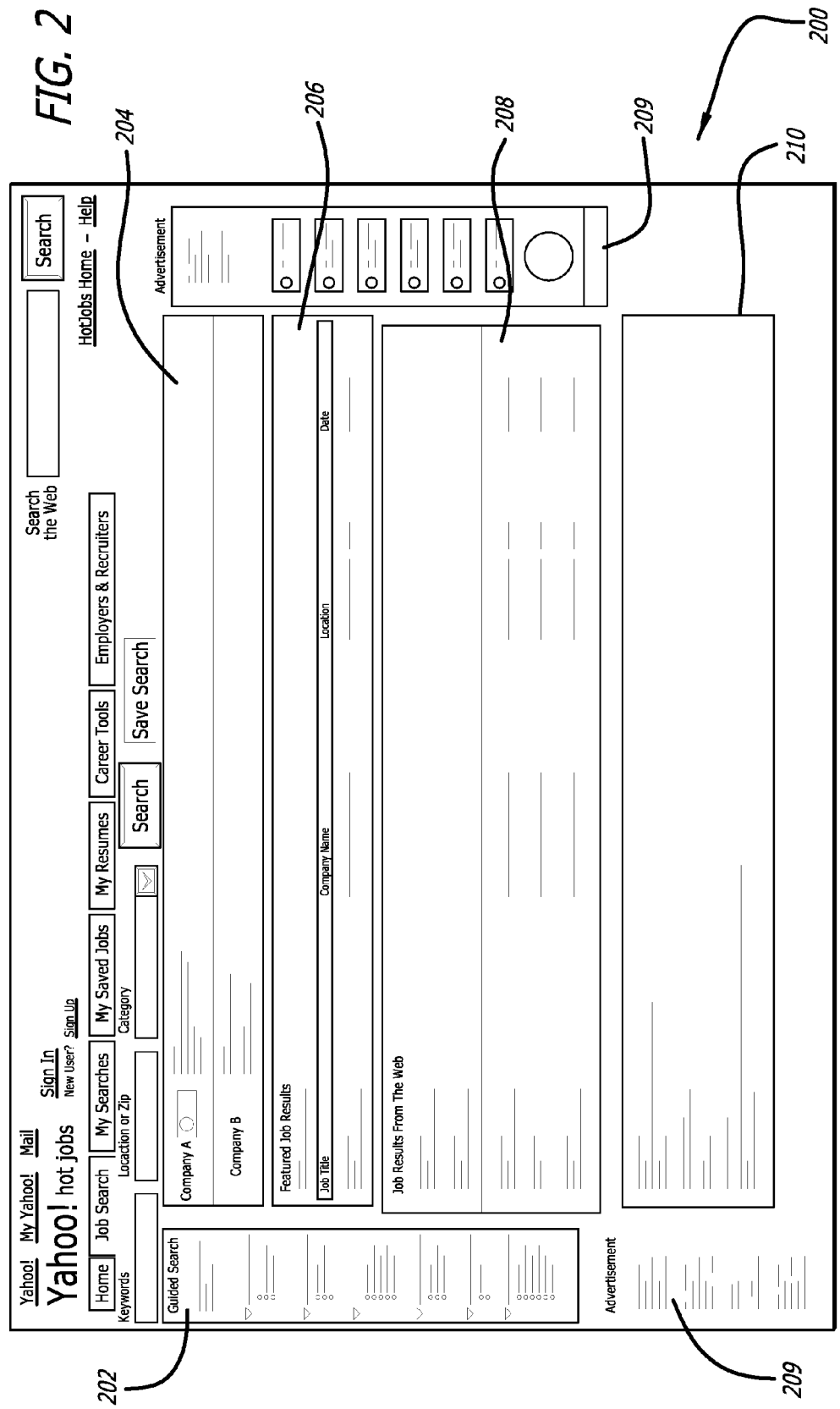
FIG. 2 is an exemplary user (job seeker) search results interface for use in an embodiment of the exemplary system shown in FIG. 1.

The server cluster 148, for example, in reaction to search terms provided by a job seeker 107 through the Internet 110, accesses the search bank 146, searches the database 126, and passes identified scraped job search listings to the cluster 148 and then to a job seeker 107 through the Internet 110 for depiction on a search result user interface screen such as is shown in FIG. 2. The extractor module 144 preferably also periodically queries the cooked database 126 to provide new scraped job postings to the scraped search bank 146 so that this scraped search bank 146 maintains a current bank of listing data sets.

The data output section 105 comprises the job search web server/client cluster 148 and a number of data source modules to this cluster 148. The scraped search bank 146 is one of these. An ad system premium listing module 150, a paid search bank 152, an overture system content match module 154 and a link builder module 156 are queried by the job search web server/client cluster 148.

The ad system premium listing module 150 organizes and provides the cluster 148 with advertisements from specific employers or recruiters that have a paid premium account with the host of the system 100. These premium advertisements may be displayed to the job seeker in a special box, bannered, highlighted, or otherwise set off from the other listings that may be presented to a job seeker 107 in response to a particular search request.

The paid search bank module 152 is a special search bank for which an employer member 160 may access upon a fee payment to the host of the system 100. This paid search bank module 152 identifies, stores, and tracks job listings from those job recruiter employer or corporations who pay a fee to ensure that their posted job listings receive a higher or emphasized placement on a user interface presented to the job seeker 107. Thus the paid postings are provided directly into the search bank 152 by the member company via a member desktop 162 or gateway 164. Paid search bank 152 contains information provided by job listing entities that have paid a premium to the operator of the system 100 described herein to push listings in connection with certain desired search categories provided by a user, so that such search results are provided in a prominent position to the user via the user interface 200 in exchange for a premium payment.

The Overture system content match module 154 queries whether there are any advertisements that match the job searcher's search criteria. These advertisements are previously stored in or linked to a paid database for use by the host of the system 100. Examples of such advertisements are shown in the search results user interface screen shot shown in FIG. 3.

The link builder module 156 provides linkage cookies and addresses to link to other sources of jobs that match the search terms provided by the job seeker 107. In some instances, in order for a job description to be viewed, the job seeker must be passed to a particular website to see the listing. In such circumstances the site might require a particular security element such as cookie, password etc. before the job information may be viewed. Accordingly, link builder module 156 provides the necessary interface characteristics in the case where a site needs a particular cookie or other identifier. The link builder module 156 manages the process to build a URL which includes the necessary information required by the site such as for example, a session cookie to access the job listing. The result of the link builder module 156 may be provided to the job seeker 107 in addition to the particular jobs of interest from his/her search request.

With continued reference to FIG. 1, the web server cluster 148 acts as a gateway interface to a job seeker 107 seeking to utilize the system 100 described herein. The job seeker 107, in order to initiate a search request on the system 100, is preferably presented with a user interface similar to that shown in FIG. 3. The cluster 148 then searches to obtain information from the system search banks 152, 154, 146 and 150 and presents it in an easy to use and efficient manner to the querying job seeker 107 such as in the exemplary results interface shown in FIG. 2.

Figure 3:
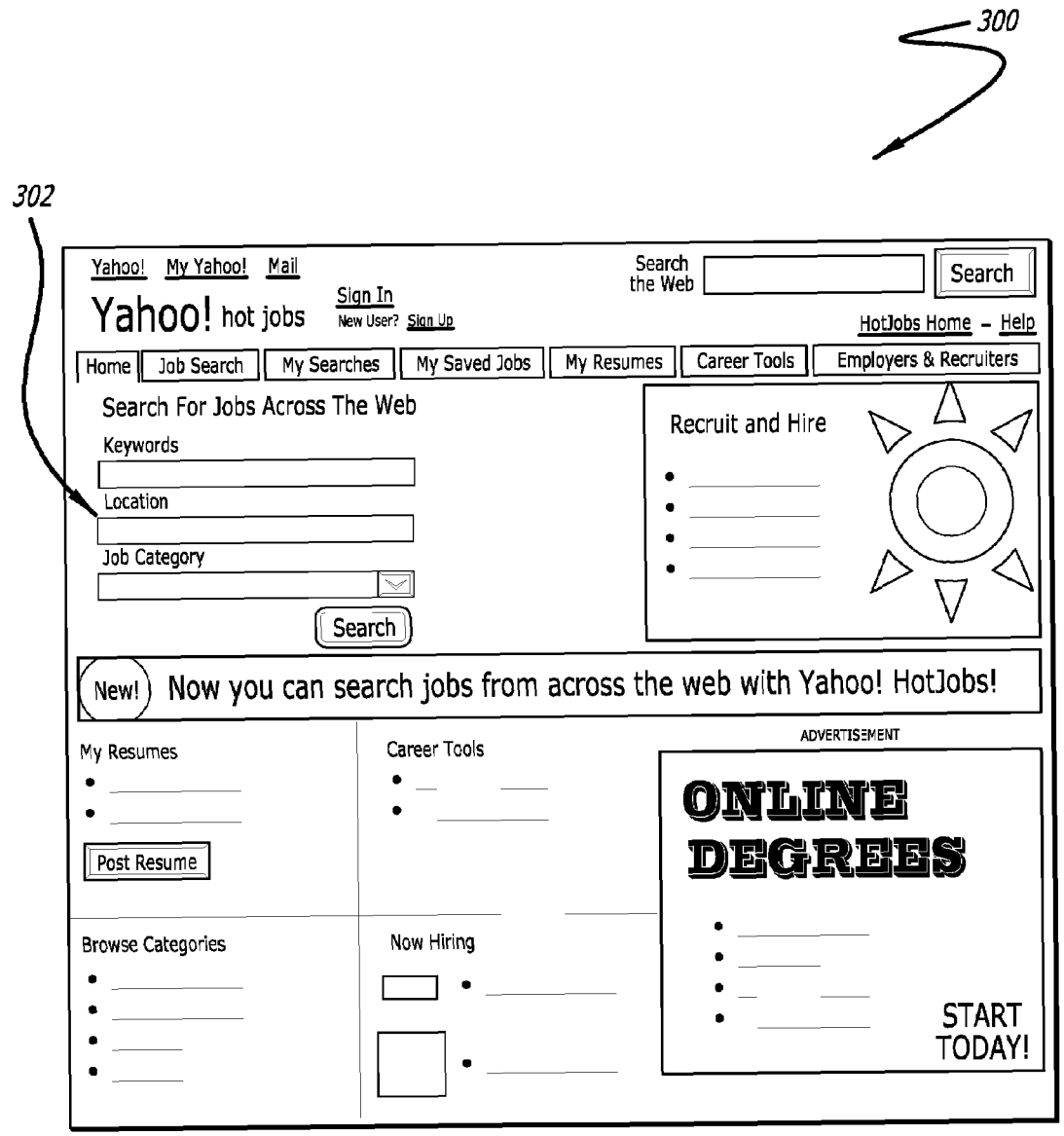
FIG. 3 is an exemplary user (job seeker) search input query interface for use in an embodiment of an exemplary system shown in FIG. 1.

A job seeker 107 entering a search request 302 into a user interface 300 such as that depicted in FIG. 3 interfaces with the server cluster 148, which in turn presents an aggregated result to the job seeker 107 as shown in FIG. 2. Thus the user would see, as described below, premium listings through the provision of listings identified by the ad system premium listing module 150, job search bank 152, the banks 154, 150, 146 and crawled jobs from bank 156.

Turning now to FIG. 2, an exemplary screen shot of a user query result interface 200 is shown. This user interface 200 gives the job seeker an opportunity to review all of the job information that match his query. In addition, it permits the job seeker to submit a different or more refined query. Display portion 202 gives the user an opportunity to review all of the job information that would match a particular search criteria, for example, in FIG. 2, a software developer position in Illinois. The job seeker may review all of the job information available as a result of the search for software developer positions, or may review only those descriptions that have been updated in the past 24 hours, 7 days, or other preselected time period. Also the job seeker may structure his or her search by experience level, location, or other characteristic or subcategories within a job description.

The interface 200 also displays result segments separated by multiple preferable result groupings. Thus the system 100 may present a segment for premium listings 204 obtained from ad system premium listing module 150, which permits the host of the system 100 to utilize the system 100 as a revenue enhancing tool by providing the opportunity for business seeking employers to pay premium to have their job listings obtain a more prominent position in the result portion of the user interface 200 presented to the job seeker 107.

The user interface 200 also preferably includes a second subsection 206 which presents results of the search from the paid job search bank 152. A third subsection 208 presents non-premium algorithmic search results which is a direct result of searching the scraped search bank 146. A fourth section 210 provides more general paid links from the overture system content match module 154. Finally, a number of advertisements 209 may be displayed from a search of the ad system premium listing module 150.

Figure 4:
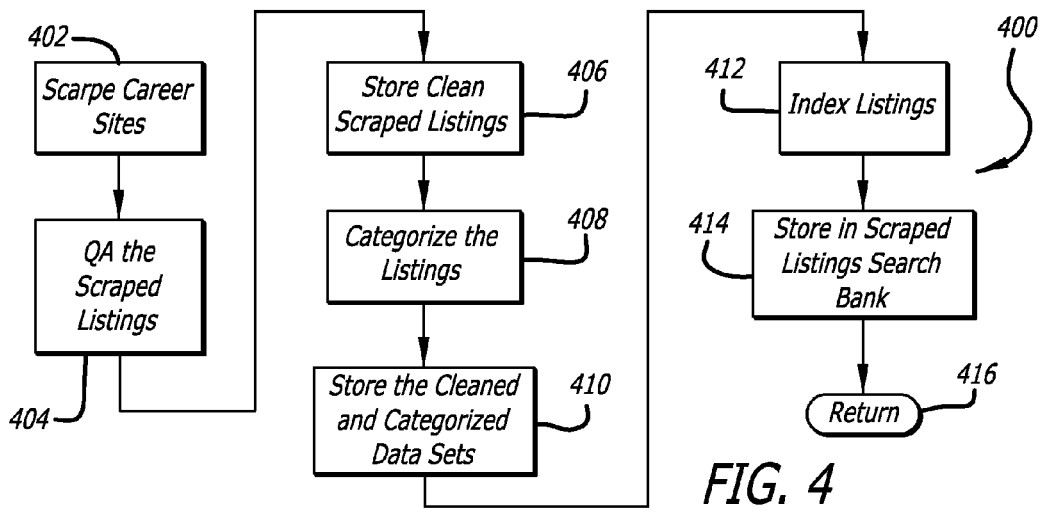
FIG. 4 is a simplified process flow through system shown in FIG. 1.

With reference to FIG. 4, a simplified functional flow diagram 400 of the scraping performed by the system 100 is shown. This scraping process begins at operation 402 where career sites 102 are scraped. Control then passes to operation 402 where the scraped listings are fed to storage in the raw database 122. Once stored, control passes to operation 404. In operation 404, the scraped listings are submitted to quality assurance/quality management processes described above and further herein with reference to modules 124 and 128. Control then passes to operation 406. In operation 406 the clean scraped listings are fed into storage in cooked database 126. Control then passes to operation 408. Here the clean scraped listings are categorized in modules 132 and 134. Control then passes to operation 410. In operation 410 the clean and categorized scraped listings are fed to storage again in the cooked database 126. Control then passes to operation 412. In operation 412, the cleaned and categorized scraped listings are indexed and formatted in the extractor module 144 for use by the semi-structured search engine described herein. Control then passes to operation 414. In operation 414 the indexed listings are stored and compiled in the scraped search bank 146 for use. Control then passes to return operation 416.

Figure 5:
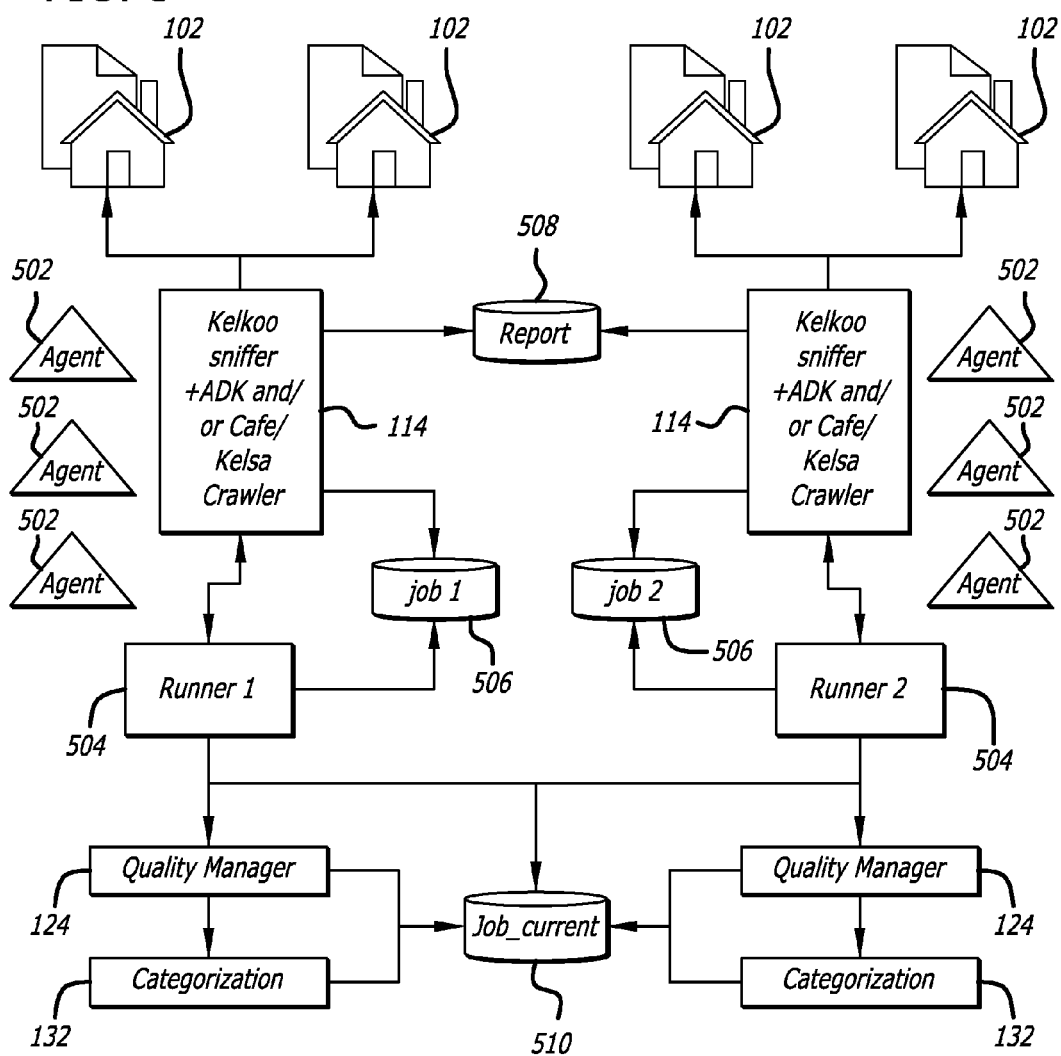
FIG. 5 is a functional diagram of scraping in accordance with an embodiment of the present disclosure.

Scraping involves the following components 500 shown in FIG. 5: the Kelkoo "Sniffer" and Café/Kelsa crawlers in scraping engine 114, a series of Agents 502 to scrape web sites 102 for jobs, preferably a MySQL database such as raw database 122 to store the scraped jobs and agent logs, and Runner scripts 504 to launch the agents 502.

The following is a summary of how data flows preferably through the scraping farm 112 in the system 100. At the beginning of the scraping cycle the "job_current" table 500 is truncated and its contents are copied to an archive table (not shown). Archives of scraped jobs are preferably stored for a limited period only (e.g. 7 days).

The Kelkoo "Sniffer" in the scraping engine 114 is a Java program that is used to launch adapters (a.k.a. agents 502). The scraping engines 114 scrape the job boards 102, via the Agents 502. Each agent 502 preferably consists of three text files: agent.info, agent.props, and agent.sql. A single agent is used to scrape a single web site. The agent files are stored in an agent specific directory. Then the agents 502 dump the scraped job information sets into a "job" table (note that there can be several job tables) 506, two of which are shown in FIG. 5. The Runners 504 copy the job information sets, or records, from the "job" table(s) 506 to the "job_current" table 510. Components downstream from the runner 504, such as the Quality Manager module 124 and the Categorizer modules 132 and 134 pull copies of the job records from the cooked database 126 and perform quality management and categorization operations on the records in the job_current table 510, which is preferably part of the cooked database 126. The results are then passed back to the cooked database 126 shown in FIG. 1.

The Kelkoo Sniffer search engine 114 thinks about agents 502 as virtual SQL tables. The schema of the virtual table is defined in the agent.sql file. The agent.info file is a SELECT statement against the virtual table that the Sniffer search engine 114 runs. The agent.props file contains the scraping logic that is used to fill the virtual table. The scraping logic is a sequence of steps that are carried out by various filters. Filters are Java classes that make up an Adapter Development Kit (ADK). Filters are executed sequentially and can read and write variables to a common context. There are filters to: find a string or a pattern in an html page and save it, manipulate variables of the context, loop over a re-occurring pattern and execute other filters in a loop, go to a page identified by a URL and retrieve its content, etc.

The output of an agent 502 is a text file that contains SQL INSERT statements for each scraped job. The Sniffer search engine 114 uses this data file to load the scraped job information data sets or records into a MySQL table, called "job" (the actual table name is a configuration parameter) 506. The Sniffer 114 is configured via various command line parameters and an arbitrary number of property files that are passed in on the command line. The most important configuration parameters of the Sniffer search engine 114 are: Name of the MySQL database, database user and password, name of the table to dump the scraped records to; and the Path to the agent request files and the directory that contains the agents 502.

The Sniffer search engine 114 is preferably single threaded: it loads and runs one agent 502 at a time. After running an agent 502 the Sniffer search engine 114 inserts a record to the "report" table 508 with information about: the time of the run, the name and path of the agent 502, the number of scraped records (jobs), and possible errors.

The agent files are stored in a CVS repository. The version of the agent 502 that has passed QA is tagged with a special CVS tag. This scheme allows agent developers, testers and the production system to work on the same tree, yet to avoid running un-tested agents in production.

The agent runner 504 is a Perl script that is developed for the system 100. The Runner 504 requires that the agent files be available on the local file system. Before the Runner 504 is started the local CVS tree is synced to the production tag to download all the agent files that should be run.

The runner 504 performs the following steps:
1. It reads its configuration file. This contains the list of agents 502 to run. Each Runner has an id that is passed in as part of the configuration.
2. It generates configuration files for the Sniffer 114 based on its own configuration.
3. It deletes all the records from the job_current table 510 that belong to the agents 502 to be run (this in most cases is unnecessary, since preferably the job_current table is truncated every day).
4. It launches the Sniffer search engine 114 that runs the agents 502.
5. It preferably processes each record in the job table to strip the job information from html tags. Each Runner has its "own" job table 506 whose name is generated using the runner's id (e.g. "job1").
6. It dumps all the records from the job table 506 to the job_current table 500. The job records contain the id of the Runner, which helps downstream components to easily identify records that came from a particular Runner 504.
7. It writes a summary of the agents run to its log file. This information is retrieved via queries to the job, job_current and the report tables 506, 500 and 508 respectively.
8. Finally, it invokes the Quality Manager management process module 124 via a secure shell such as SSH, so it can execute on a separate machine. The ID of the Runner 504 is passed to the Quality Manager module 124, so it knows which records to process from the job_current table 500.

Figure 6:
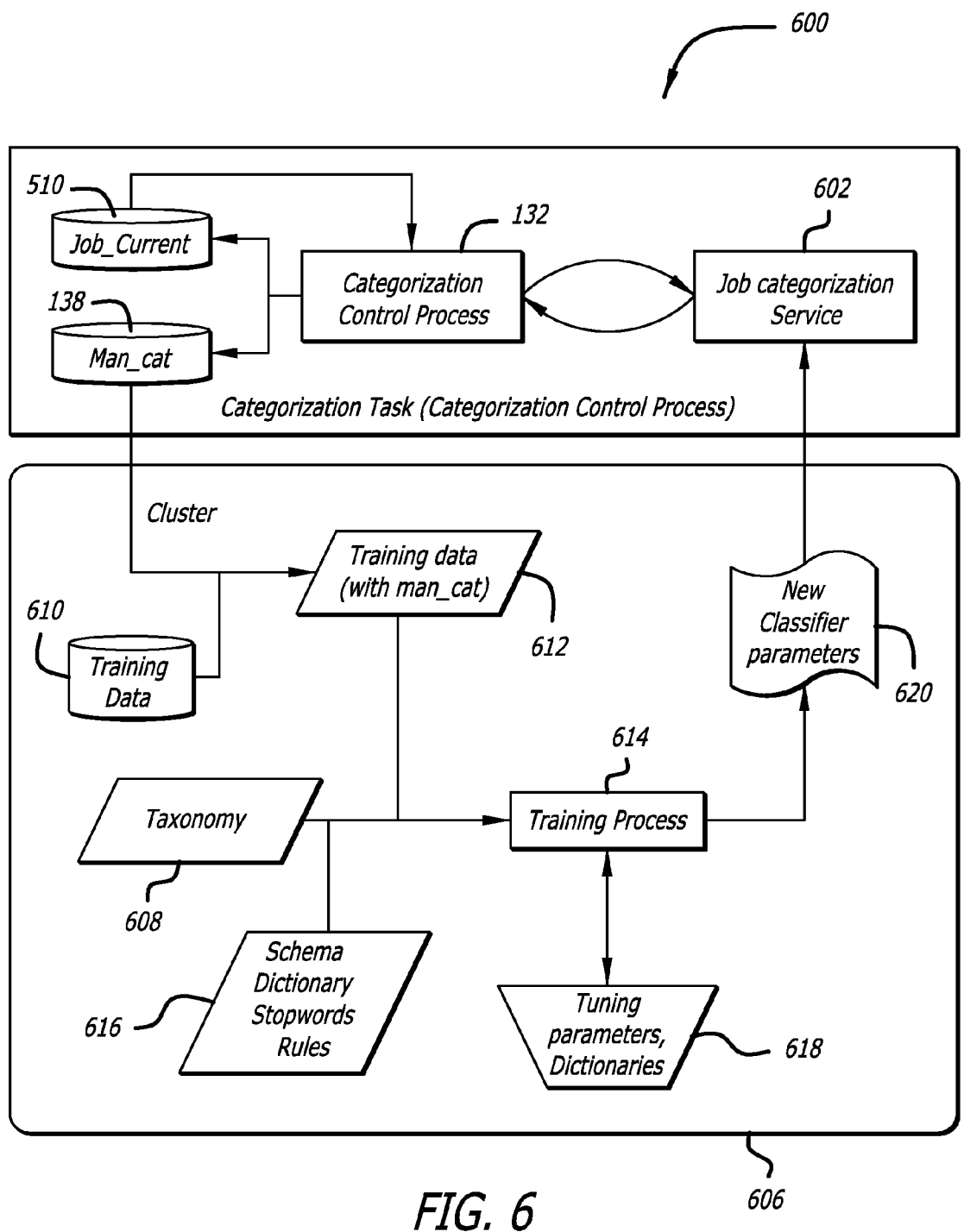
FIG. 6 is diagram of the job categorization control module in the embodiment of the system shown in FIG. 1.

The system 100 is primarily designed to handle scraped jobs in addition to listings provided from standard sources that generally have standardized formats and categorizations. These scraped jobs typically may not have category assignments such as Accounting, Banking, Engineering, medical, dental, etc. In order to support a "browse by category" feature that jobseekers are most familiar with, we could have many human categorizers spend a great deal of time to manually classify jobs as they are scraped. However, this has substantial drawbacks. It is a very time consuming process. By the time the jobs are manually classified, they may be outdated already. Such a process requires a lot of human resources. Further different categorizers may not categorize in the same consistent manner. For this reason, an exemplary automatic Job Categorization System 600 that may be used is shown in FIG. 6. This system 600 is capable of categorizing a job in a fraction of a second. It is substantially faster than human categorizer, and, it is consistent.

This Job Categorization System 600 contains several modules. A job categorization (Job Cat) Service module 602 which carries out the actual categorization routine. The Job Categorization Control Process module 132 is one example, which is described with FIG. 1, which manages communication between the Job_current table 510 in the cooked database 126, the ManCat database 138, and the DCP 140. The DCP 140 corresponds to one example of a Job Cat Service module 602. The Categorization Training Process, which is used to enhance or maintain the accuracy level of the Job Cat Service 602. This categorization training process involves the use of the job categorization manual review interface 134 and categorization experts 136 shown in FIG. 1.

As described above, the jobs scraped are added to a MySQL job_current table 510. Then the Job Categorization Process 600 will take each job from the job_current table 510, and send it through the job categorization control process module 132 to the Job Cat Service module 602 to get a category and confidence assignment. Then the scraped job is sent back to the categorization control process module 132 and returned to the job_current table 510. However, if a job falls below a predetermined confidence threshold it will be flagged, i.e. a flag set, and when it passes through the categorization control process module 132 a copy is also sent to the mancat database 138 for manual review via the manual review interface module 134. The results of the manual review process performed in review module 134 are then used by the Categorization Training Process 606 to tune a new Job Cat Service value to replace the old one. The result of classification is written back to job_current table 510 and sometimes the mancat table 138. The Manual review module 134 provides a UI to review both jobs in job_current and mancat tables.

Figure 7:
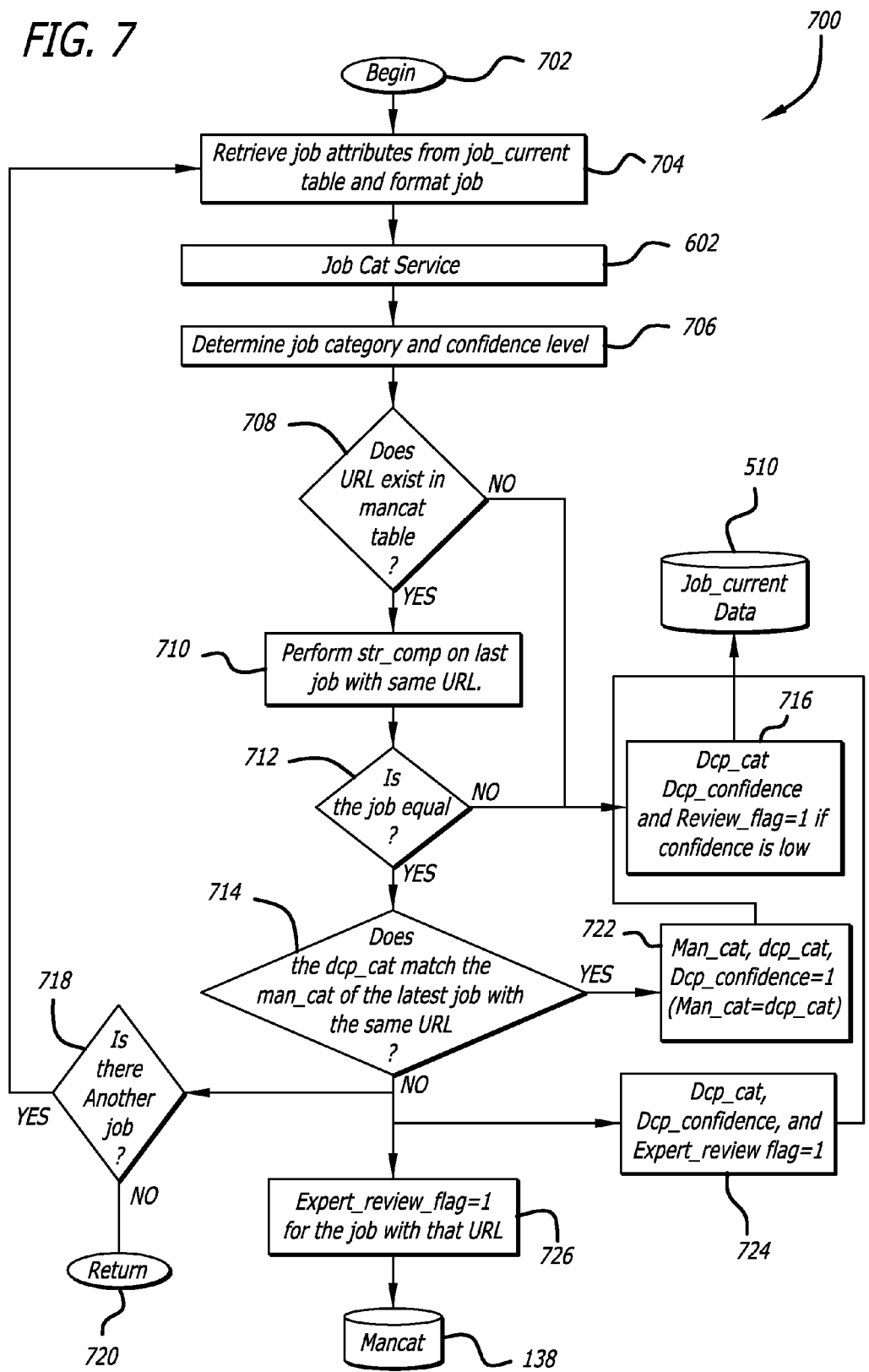
FIG. 7 is an operational flow diagram of the job categorization process in accordance with an embodiment of the system shown in FIG. 1.

FIG. 7 is an operational flow diagram of an implementation of the job categorization process 600. The process begins in operation 702 when a sequence of job scrapings has been performed. Control transfers to operation 704. In operation 704 the job attributes for the next job are retrieved from the job_current table 510 and the job information is properly formatted. The job attributes are then transferred to the job cat service 602 to find a proper category. Control then transfers to operation 706 where the job category and confidence level for that categorization are paired with the job. Control then transfers to query operation 708.

Query operation 708 asks whether there is a matching URL existing in the mancat table for the latest particular job information. If there is, then control transfers to operation 710. If not, the job is a new job, and control transfers to operation 716.

In operation 710, a string compare routine is performed on the last job with the same URL. Control then transfers to query operation 712. Query operation 712 asks whether the listing in the mancat table 138 is the same as the current job being examined. If the job string compare is equal, then the answer is yes, and control transfers to operation 714 since it appears that the job is the same job. On the other hand, if the answer is no, the job is new, and control again transfers to operation 716.

Query operation 714 asks whether the dcp_cat matches the man_cat of the latest job with the same URL. If the answer is yes, then the man_cat and dcp_cat are set equal and the dcp_cat confidence is set equal to 1.

The job parameters back to the job_current table 510, and control transfers to query operation 718. Query operation 718 asks whether there are more scraped jobs in the job_current table to be categorized. If not, control transfers to return operation 720. If there are more scraped jobs to be categorized, control passes back to operation 704 and the job parameters for the next job are retrieved and formatted.

Returning to query operation 708, if the URL does not exist in the mancat table, then control transfers to operation 716. In operation 716, the Dcp_cat and dcp_confidence are set, the confidence value is checked against the threshold that has been predetermined, and if the threshold is greater than the confidence value, the review_flag is set equal to 1. The job parameters are then passed to the job_current table 510 and again, control passes to query operation 718.

Returning to query operation 714, if the current jog has a URL in the mancat table 510, the job is the same as the last job with the same URL, but the dcp_cat and an_cat of the latest job do not match, then something may be wrong or missing, and the job parameters are passed to both operations 724 and 726. Operation 724 sets the dcp_cat, the dcp_confidence values, sets the expert_review flag=1 and feeds this data to the Job_current table 510. Operation 726 sets the expert_review flag=1 and sends a copy of this job's parameters to the mancat database 138 so that manual review will be performed. In parallel, control again passes to the query operation 718 as described above.

Thus, for each job, the Job Categorization Control Process take job attributes from the job_current table, formats them, and sends them over to Job Cat Service managed by a well known public domain routine called Apache, method=POST), gets back a category and confidence score, goes through a chain of decision questions, and writes results back to the tables.

Figure 8:
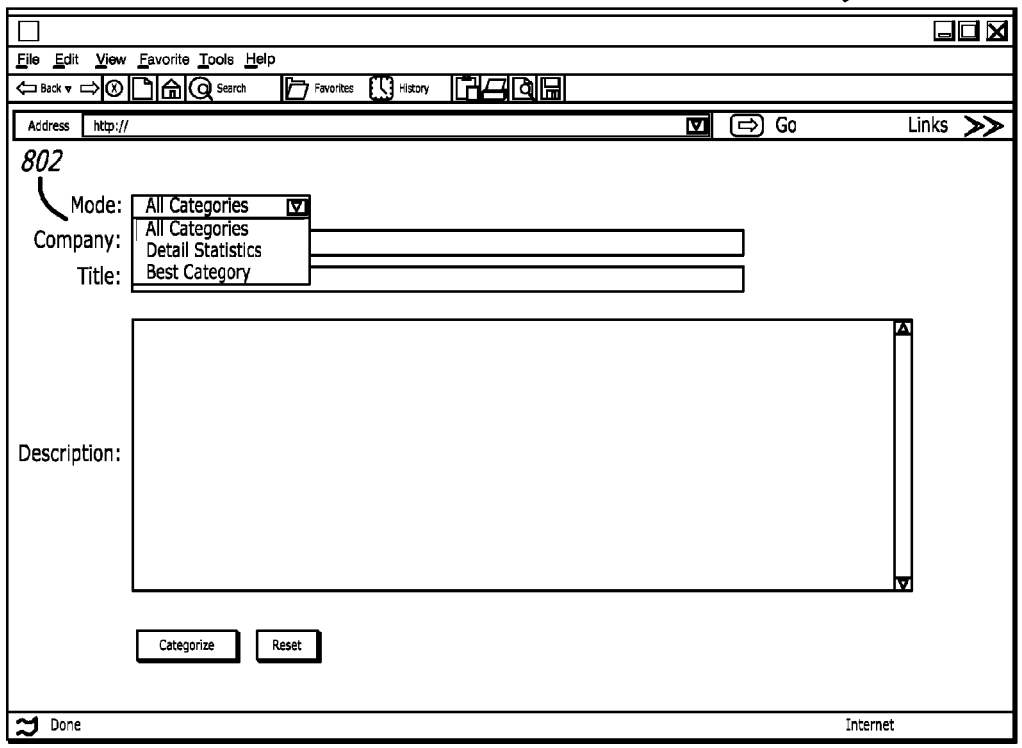
FIG. 8 is a screen shot of an exemplary document categorization platform service user interface for the job categorization process.

The Job Cat Service 602 also provides a web UI that allows administrators and system operators in a job (at least the job description) and submit the job to the Job Cat Service for categorization separately from the normal operation of the system 100. Such an exemplary user interface 800 is shown in FIG. 8.

The Job Cat Service 602 depends on Apache, a well known management routine to manage the training process 606 shown in FIG. 6. The JobCat Service 602 contains a binary package that is a shared library of PHP extensions and also includes a Categorization library. Building the Job Cat Service 602 first requires a set of basic definitions i.e. a taxonomy 608, of job categories and associated unique ID numbers. An exemplary set is shown in Table 1 below.

TABLE 1

| Cat_id | Cat_name |
|---|---|
| 1 | Accounting_Finance |
| 2 | Advertising_Public_Relations |
| 3 | Arts_Entertainment_Publishing |
| 4 | Banking_Mortgage |
| 5 | Clerical_Administrative |
| 6 | Construction_Facilities |
| 7 | Customer_Service |
| 8 | Education_Training |
| 9 | Engineering_Architecture |
| 10 | Government |
| 11 | Health_Care |
| 12 | Hospitality_Travel |
| 13 | Human_Resources |
| 14 | Insurance |
| 15 | Internet_New_Media |
| 16 | Law_Enforcement_Security |
| 17 | Legal |
| 18 | Management_Consulting |
| 19 | Manufacturing_Operations |

TABLE 1-continued

| Cat_id | Cat_name |
|---|---|
| 20 | Marketing |
| 21 | Non_Profit_Volunteer |
| 22 | Pharmaceutical_Biotech |
| 23 | Real_Estate |
| 24 | Restaurant_Food_Service |
| 25 | Retail |
| 26 | Sales |
| 27 | Technology |
| 28 | Telecommunications |
| 29 | Transportation_Logistics |
| 30 | Work_At_Home |

An exemplary table of training job information, training data 610, is associated with each of the categories in Table 1. This set of descriptions, plus the content of the mancat database 138, is used to teach the Service to recognize classifications from the provided job information parameters that are preclassified. An example of this table is shown in Table 2 below.

TABLE 2

| Field | Type | Null | Comment |
|---|---|---|---|
| Pindex | Varchar(11) | No, Primary key | |
| Title | Varchar(11) | Yes | |
| Ldesc | Text | No | |
| Mancat | Varchar(101) | No | Actually set to the first industry setting initially |
| Gid | Int | Yes | Group id, some id are used by HJ internal for testing, they should not be used for training |
| Hiretype | Varchar(21) | Yes | |
| Companyname | Varchar(101) | Yes | |
| Salarytype | Varchar(21) | Yes | |
| Sdesc | Varchar(101) | Yes | |
| Sourcetype | Varchar(11) | Yes | |
| Source | Varchar(21) | Yes | |
| Duration | Varchar(3) | Yes | |
| Position | Varchar(21) | Yes | Experience level |
| Degrees | Varchar(31) | Yes | |
| Salaryfrom | Float | Yes | |
| Salaryto | Float | Yes | |
| Ownerid | Varchar(11) | Yes | |
| Creatorid | Varchar(11) | Yes | |
| Editorid | Varchar(11) | Yes | |
| Ctime | Date | Yes | Date created |
| Mtime | Date | Yes | Date modified |
| Score | Int | Yes | The YSS score, not used |

For new training sessions, it is preferable to use both jobs from this table and those in the mancat table. As more and more manual reviewed jobs become available, it is preferable to eventually drop the original training set from the HotJob's read-only database.

In a preferred embodiment the columns of this table 2 and the mancat table are different, and this difference will remain, and the script that creates the training file will do all necessary mappings. The training process 606 consists of several PEARL scripts. A "create-training-file.pl" script takes jobs from both the mancat table 138 and a train data table 610, and writes out a file containing all jobs in a DCP accepted format to generate the merged training data 612. A "train-hj-dcp.pl" script is used to tune a few of the most useful parameters for classification. Each of the configurations specified will leave an output directory containing all the parameters that are needed to build a Job Cat Service data package, and a log file. A "parse-training-log.pl" script reads each of the log files generated by the train-hj-dcp.pl script and generates a report on accuracy for each configuration. An "archive-training-results.pl" script is used to archive the training results for that configuration after a configuration is used for deployment.

The training process 614 is basically a manual process that draws from the training data 612, the taxonomy 608, and sets of rules and schema 616. Various dictionaries and tuning parameters 618 may also be utilized. The results involve optimization of new classifier parameters 620 with the results being provided into the job categorization service 602 as shown in FIG. 6. Since the training process 614 is mostly manual, it is preferable to train on a few parameters, manually check the results, e.g. detail pages of classification, term weights, etc, and change some of the rules and dictionaries by hand, and repeat the process with different configurations in order to find the optimal settings for deployment. When such an optimal configuration is achieved, the new classifier parameters 620 are passed to the Job Categorization Service 602. Once the Job Categorization Service is built up and running, scraped jobs can then be processed as described above.

The screen shot of the exemplary user interface 800 is presented to an administrator, operator or categorization expert 136 through the internet 110 using a web browser. The interface 800 provides three different modes 802 via a pull down menu as shown. The "all categories" mode lists all categories and their corresponding confidence values, sorted in descending order by confidence. The "Detail Statistics" mode shows the details on why a particular category is chosen. This mode is useful for an operator who tunes the system 100. The "Best Category" mode shows only the top category for the job and its confidence. This is equal to the first result shown in "All Categories" mode, except here we show the category ID number, not a string. This mode is intended for automatic classification of jobs in the database, where the category ID number is preferred over the category name.

Figure 10:
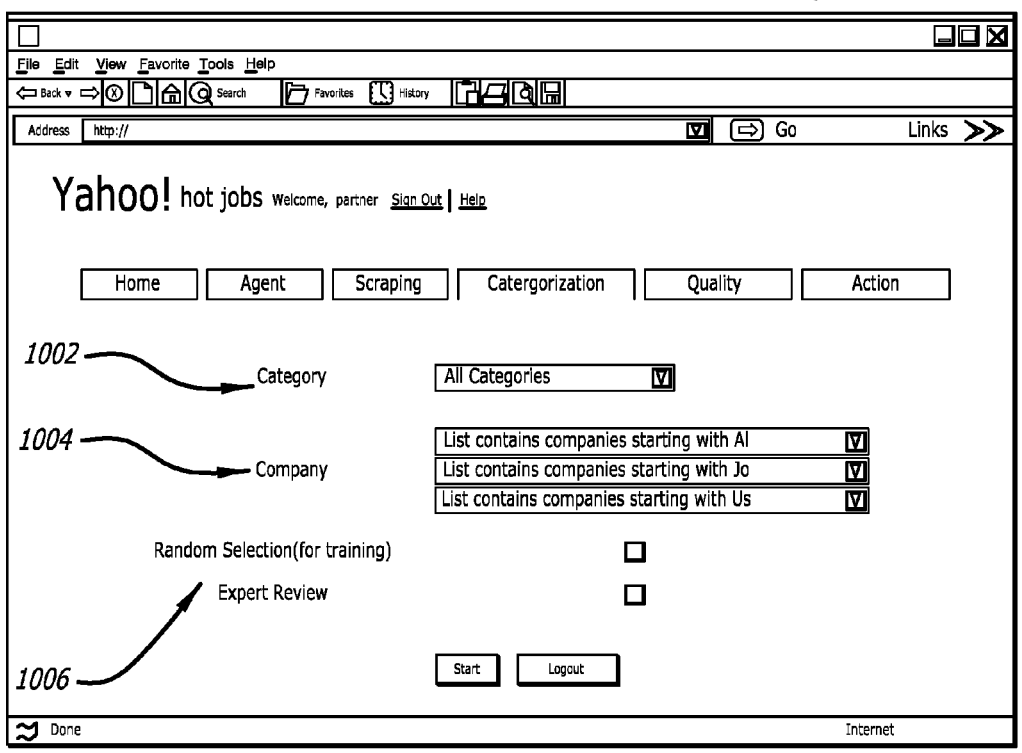
FIG. 10 is a screen shot of an exemplary user interface for a job categorization manual review interface module.
Figure 9:
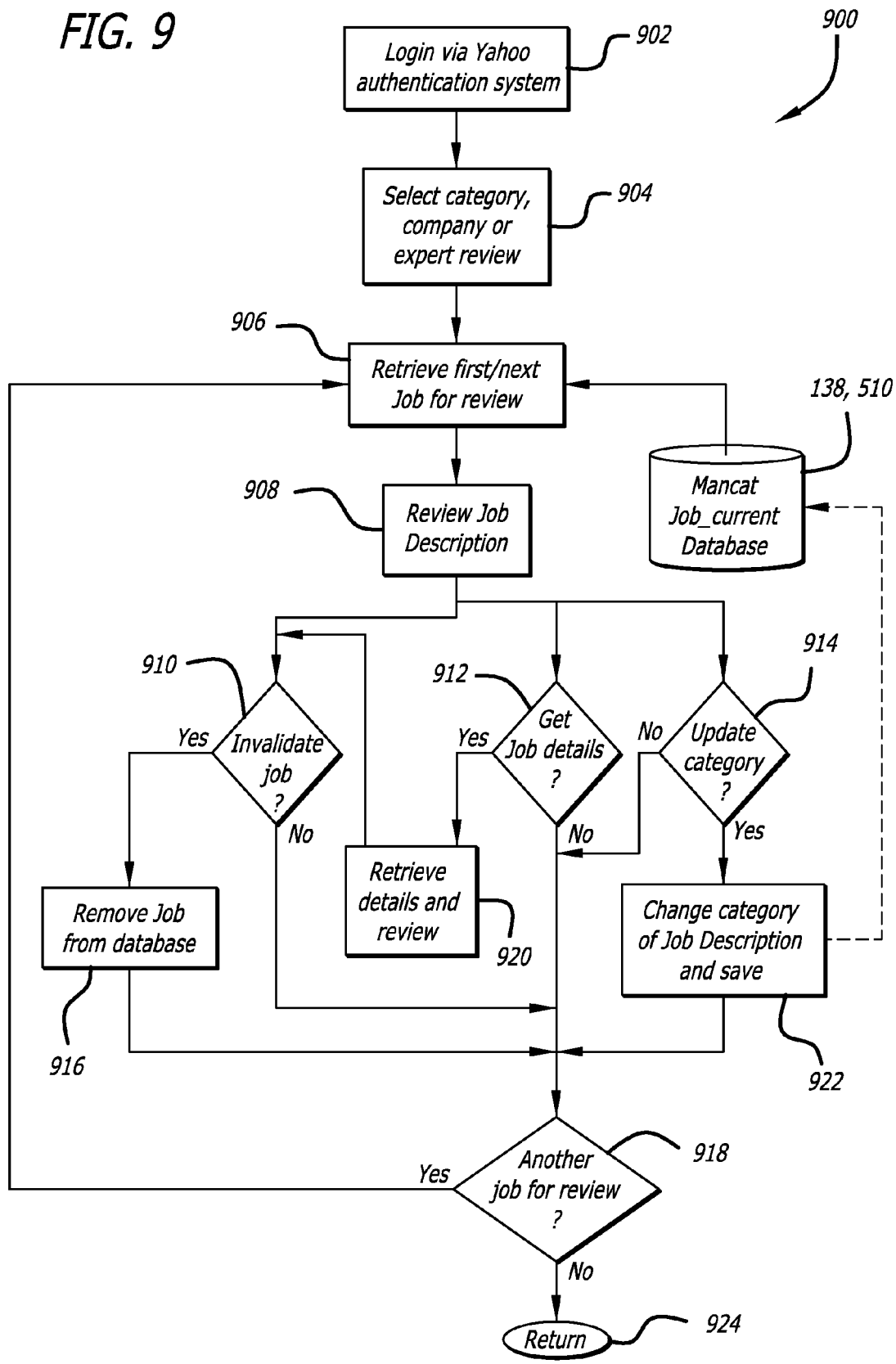
FIG. 9 is a process flow diagram for a job categorization manual review interface module.
Figure 11:
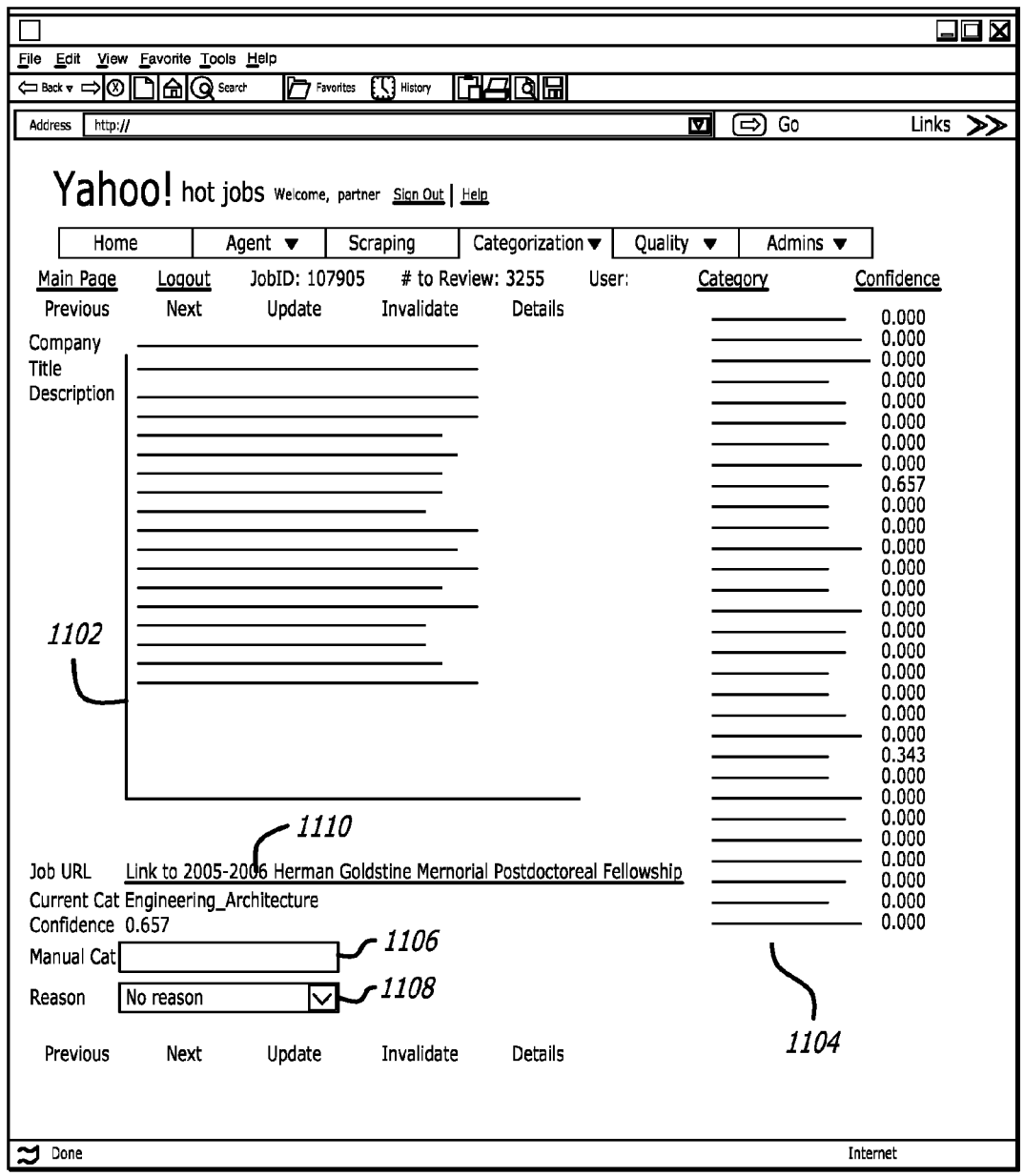
FIG. 11 is a screenshot of an exemplary user interface of job information being manually reviewed.

An operational flow diagram of the job categorization manual review process 900 that takes place in the job categorization manual review module 134 is shown in FIG. 9. Operational flow begins when an administrative operator or a categorization expert 136 logs in via backyard in operation 902. When the administrator logs in, he or she is presented in operation 904 with a user interface 1000 as shown in FIG. 10. This user interface 1000 permits the administrator or expert reviewer choices of job category 1002, company 1004, and selection of a type of review 1006 to conduct. Control then transfers to operation 906. In operation 906, a first/next job information is retrieved from the mancat database 138 or the job-current file 510 in the cooked database 126, depending on the administrator's prior selections in operation 904. The administrator is presented with a user interface such as the exemplary interface 1100 shown in FIG. 11.

This user interface 1100 displays the first/next job information 1102 along with the category confidence level s determined for each category. In this example, the job is a post-doc position at IBM Corp. The confidence levels are zero for all but Engineering_Architecture and Pharmaceutical_Biotech, and none of the levels match 100%. This position has been categorized as Engineering Architecture, but the confidence level is only 0.657, so it was flagged for manual review.

Referring back to FIG. 9, when the job information is retrieved in operation 906, control transfers to operation 908 where the administrator analyzes the categorization based on the full job information. The administrator then has three choices of action. First, he can invalidate the job in query operation 910. Second, he can get more job details in query operation 912 by clicking on the job URL 1110 to enhance his review. Third, he can update a category definition or insert a new category in query operation 914. If his decision is to invalidate the job in query operation 910, then control transfers to operation 916 where the job is removed from the database 126 and from the mancat database 138. Control then transfers to query operation 918. Query operation 918 asks whether there is another job information in the queue of the mancat database 138 or job_current table 510 that has its expert_review flag=1 set. If so, control transfers back to operation 906 where the next job is retrieved for review.

However, if the decision in operation 910 is not to invalidate the job, control resets the expert_review flag=0, returns the job to the job_current table 510 and control transfers to query operation 918. If the choice in operation 908 is to get more job details, control transfers to operation 920, where the details are retrieved and control transfers back again to operation 908. If the administrator then chooses not to get more details, the job listing record is again returned to the job_current table 510 after resetting the expert_review flag=0 and control passes again to query operation 918. If the choice in operation 908 is to update the category in query operation 914, then control passes to operation 922.

In operation 922 the category of the job listing is changed or a new one added, and saved. The expert_review flag is set=0 and the job listing information is then transferred to the job_current database 510 and control transfers to query operation 918. If there are no more job listings with expert_review flags set=1, control transfers to return operation 924 and the review session is complete.

Although functional components, modules, software elements, hardware elements, and features and functions described herein may be depicted or described as being fixed in software or hardware or otherwise, it will be recognized by persons of skill in the art that the features and functions described herein may be implemented in various software, hardware and/or firmware combinations and that the functions described herein may be distributed into various components or subcomponents on the network and are not fixed to any one particular component as described herein. Thus the databases described may be separated, unified, federated, or otherwise structured to best suit the preferences of the implementer of the features and functions described herein. Also, the functions described herein as preferably being performed manually may be performed manually or may be divided into subtasks which may be automated and ultimately performed by intelligent subsystems which mimic human operator interaction such as artificial intelligence systems which may be trained by human operations and ultimately function autonomously. Further features, functions, and technical specifications are found in the attached descriptions further below as well as the figures contained therein.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer system comprising:
a plurality of processors;
a scraping module implemented on one of the plurality of processors having one or more scraping engines operable to scrape a job information data set from job listings on corporate career sites and job boards, wherein the scraping module receives and stores the scraped job information data sets in a database, the job information data sets each comprising data fields;

a scraping management interface module implemented on one of the plurality of processors for coordinating operation of and communication between the scraping engines and the career sites and job boards;

a scraped listing quality management module implemented on one of the plurality of processors coupled to the scraping management interface module for analyzing data fields of selected scraped job information data sets stored in the database for conformance to predetermined listing quality criteria, the quality management module comprising a de-duplication sub-module for eliminating prior scraped information data, a dead link removal sub-module, and a text filtering sub-module for filtering offensive text;

a job categorization module implemented on one of the plurality of processors operable to examine and categorize each job information data set stored in the database into one or more of a predetermined set of categories and return categorized job information data to the database;

wherein the job categorization module further comprises
a categorization database, and
a document categorization platform service determining a confidence value in each predetermined category for each scraped job information data set by comparing text of each scraped job information data set with previously categorized job information text in the categorization database;

an extractor module implemented on one of the plurality of processors for communicating with the database for compiling and transferring categorized job information data from the database to a search bank;

a premium listing module implemented on one of the plurality of processors operable to prioritize display of job information presented to the job searcher based on paid advertising from employers; and an output implemented on one of the plurality of processors coupled to the search bank and communicatively coupled to the job searcher for communicating the results of a job search query of the search bank to the searcher for visible display on a user interface.

2. The system according to claim 1, the output comprising a job search client server connected to the search bank and to a network accessible by the job searcher.

3. The system according to claim 2 wherein the network is the Internet.

4. The system according to claim 1 wherein the job categorization module further comprises a manual review interface permitting a reviewer to verify categorizations determined by the document categorization platform service.

5. The system according to claim 1 wherein job information returned to the database includes an assigned category determined by the categorization module and an assigned confidence value for that category.

6. The system according to claim 5 wherein job information returned to the database further includes a confidence value for each predetermined category.

7. The system according to claim 5 wherein job information returned to the database includes a manual review flag set if the assigned confidence value is below a predetermined threshold value.

8. The system according to claim 1 wherein the scraped listing quality management module sets a flag associated with a data field of each scraped job information data set not meeting predetermined criteria.

9. The system according to claim 8 further comprising a scraped listing quality manual review module communicating with the scraped listing quality management module permitting a reviewer to manually examine scraped job information data sets for which the flag has been set.

10. A method comprising:
scraping, by a processor, job information data sets from one or more job listings on one or more corporate career sites or job boards;
storing, by the processor, the scraped job information data set corresponding to each scraped job listing in a database, each job information data set comprising data fields;
analyzing, by the processor, the data fields of each scraped job information data set stored in the database for conformance to predetermined quality criteria comprising elimination of duplication of prior scraped information data sets, removal of dead links, and filtering of offensive text;
categorizing, by the processor, each job information data set stored in the database into one or more predetermined job categories and returning the categorized job information data sets to the database;
transferring, by the processor, categorized job information data sets from the database to the search bank;
obtaining and storing, by the processor, paid job information data sets from paid job advertisers in a paid search bank for subsequent presentation to a job searcher in conjunction with scraped job information data sets in response to a job searcher's query; and
communicating, by the processor, a query result to the job searcher,
wherein the categorizing step further comprises
comparing text of each scraped job information data set with previously categorized job information text in a categorization database, and
determining a confidence value in each predetermined category for each scraped job information data set.

11. The method according to claim 10 wherein the scraping operation further comprises:
accessing one of the corporate career sites or job boards through the Internet.

12. The method according to claim 10 further comprising:
flagging each categorized scraped job information that has a confidence value below a predetermined value for manual review; and
providing a manual review interface permitting a reviewer to verify any flagged categorizations.

13. The method according to claim 10 further comprising assigning a confidence value for the category assigned to each job information returned to the database.

14. The method according to claim 13 further comprising flagging any job information returned to the database having an assigned confidence level below a predetermined threshold.

15. The method according to claim 10 further comprising:
transferring selected categorized job information data from the search bank through a job search client server to a job searcher in response to a query by the job searcher.

16. The method according to claim 10 wherein the scraping operation further comprises:
accessing one of the corporate career sites or job boards through the Internet;
flagging any scraped job information data set not meeting the predetermined quality criteria;

permitting a manual review of flagged job information returned to the database, and the job categorizing operation further comprises;

comparing text of each scraped job information data set with previously categorized job information text in a categorization database; and determining a confidence value in each predetermined category for each scraped job information data set.

17. The method according to claim 16 further comprising:

flagging each categorized scraped job information data set that has a confidence value below a predetermined value for manual review; and providing a manual review interface permitting a reviewer to verify any flagged categorizations.

18. The method according to claim 17 further comprising transferring selected categorized job information data sets from the search bank through a job search client server to a job searcher in response to a query by the job searcher.

19. A computer readable medium tangibly encoding a computer program of instructions for executing a computer process, comprising:

scraping job information data sets from one or more job listings on corporate career sites and job boards;

storing the scraped job information data set corresponding to each scraped job listing in a database, each job information data set comprising data fields;

analyzing the data fields of each scraped job information data set stored in the database for conformance to predetermined quality criteria eliminating duplication of prior scraped information data, removing dead links, and filtering of offensive text;

categorizing each job information data set stored in the database into one or more job categories and returning the categorized job information data sets to the database;

transferring categorized job information data sets from the database to a search bank; and obtaining and storing paid job information data sets from paid job advertisers in a paid search bank for subsequent presentation to a job searcher in conjunction with scraped job information data sets.

20. The computer readable medium of claim 19 wherein the process further comprises:

accessing one of the corporate career sites or job boards through the Internet;

flagging any scraped job information data sets comprising data fields not meeting the predetermined quality criteria;

permitting a manual review of flagged job information data sets returned to the database, and the job categorizing operation further comprises:

comparing text of each scraped job information data set with previously categorized job information text in a categorization database; and determining a confidence value in each predetermined category for each scraped job information data set.

21. A computer readable medium tangibly encoding a computer program of instructions for executing a computer process, comprising:

scraping job information data sets from one or more job listings on corporate career sites and job boards;

storing the scraped job information data set corresponding to each scraped job listing in a database, each scraped job information data set comprising data fields;

analyzing data fields of each scraped job information data set stored in the database for conformance to predetermined job information quality criteria and including elimination of duplication of prior scraped information data, removal of dead links, and filtering of offensive text;

categorizing each job information data set stored in the database into one or more job categories, automatically learning from manually input categorization data and returning the categorized job information data set to the database;

transferring categorized job information data sets from the database to a search bank; and obtaining and storing paid job information from paid job advertisers in a paid search bank for subsequent presentation to a job searcher in conjunction with scraped job information data sets, wherein the categorizing step further comprises comparing text of each scraped job information data set with previously categorized job information text in a categorization database, and determining a confidence value in each predetermined category for each scraped job information data set.

22. The method according to claim 10 wherein the categorizing operation further comprises automatically learning from manually input categorization data.

23. The system according to claim 1 wherein the job categorization module is configured to automatically learn from manually input categorization data.

24. A computer implemented job categorization system comprising:

providing a job categorization database;

comparing, by a processor, text in data fields of each scraped job information data set with previously categorized job information text in a job categorization database;

determining, by the processor, a confidence value in each predetermined category for each data field in each scraped job information data set;

presenting, by the processor to an administrator a user interface displaying a selection of one of the scraped job information data sets from the database for review along with a predetermined confidence level for each of a plurality of categories determined from a plurality of parameters used to determine the predetermined confidence level;

manually changing one of the plurality of parameters if the highest confidence level does not correspond to an appropriate category for that job information data set;

returning, by the processor, the job information data set to the database;

transferring, by the processor, job information data sets from the database to a search bank; and repeating the presenting, manually changing and returning operations for a next job information data set.

25. A method comprising:

scraping, by a processor, job information data sets from one or more job listings on one or more corporate career sites or job boards;

storing, by the processor, a scraped job information data set corresponding to each scraped job listing in a database, the scraped job information data set comprising data fields;

analyzing, by the processor, data fields of each scraped job information data set stored in the database for conformance to predetermined quality criteria, elimination of duplication of prior scraped information data, removal of dead links, and filtering of offensive text;

categorizing, by the processor, each job information data set stored in the database into one or more predetermined job categories and returning the categorized job information data set to the database;

presenting, by the processor and to an administrator a user interface displaying a selection of one of the scraped job information data sets for review from the database for review along with a predetermined confidence level for each of a plurality of categories determined from a plurality of parameters used to determine the predetermined confidence level;

permitting, by the processor, the administrator to change one of the plurality of parameters if the highest confidence level does not correspond to an appropriate category for that job information data set;

returning, by the processor, the job information data set to the database; and repeating, by the processor, the presenting, permitting and returning operations for a next job information data set;

transferring, by the processor, categorized job information data sets from the database to a search bank;

obtaining and storing, by the processor, paid job information from paid job advertisers in a paid search bank for subsequent presentation to a job searcher in conjunction with scraped job information data sets in response to a job searcher's query; and communicating, by the processor, a query result to the job searcher, wherein the categorizing each job information data set further comprises
comparing text of each scraped job information data set with previously categorized job information text in a job categorization database, and
determining a confidence value in each predetermined category for each scraped job information data set.

26. The method according to claim 25 wherein the scraping operation further comprises:
accessing one of the corporate career sites or job boards through the Internet.

27. The method according to claim 25 wherein the categorizing operation comprises:
comparing text of each scraped job information data set with previously categorized job information text in a categorization database; and
determining a confidence value in each predetermined category for each scraped job information data set.

28. The method according to claim 27 further comprising:
flagging each categorized scraped job information data set that has a confidence value below a predetermined value for manual review.

29. The method according to claim 25 further comprising assigning a confidence value for the category assigned to each job information data set returned to the database.

30. The method according to claim 29 further comprising flagging any job information data set returned to the database having an assigned confidence level below a predetermined threshold.

31. The method according to claim 25 further comprising:
transferring selected categorized job information data from the search bank through a job search client server to a job searcher in response to a query by the job searcher.

32. The method according to claim 25 wherein the scraping operation further comprises:
accessing one of the corporate career sites or job boards through the Internet;
flagging any scraped job information data sets comprising data fields not meeting the predetermined quality criteria;
permitting a manual review of flagged job information data sets returned to the database, and the job categorizing operation further comprises:
comparing text of each scraped job information data set with previously categorized job information text in a categorization database; and
determining a confidence value in each predetermined category for each scraped job information data set.

33. The method according to claim 32 wherein the manual review is performed by the administrator.

34. The method according to claim 25 further comprising:
flagging each categorized scraped job information data set that has a confidence value below a predetermined value for manual review; and
providing a manual review interface permitting a reviewer to verify any flagged categorizations.

35. The method according to claim 34 further comprising transferring selected categorized job information data from the search bank through a job search client server to a job searcher in response to a query by the job searcher.

* * * * *